(12) United States Patent
Roussos et al.

(10) Patent No.: US 10,313,357 B2
(45) Date of Patent: Jun. 4, 2019

(54) REDUCED USER AUTHENTICATION INPUT REQUIREMENTS

(71) Applicant: Microsoft Technology Licensing, LLC, Redmond, WA (US)

(72) Inventors: George E. Roussos, Seattle, WA (US); Christopher S. Dickens, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 154 days.

(21) Appl. No.: 15/406,439

(22) Filed: Jan. 13, 2017

(65) Prior Publication Data
US 2018/0205741 A1 Jul. 19, 2018

(51) Int. Cl.
*H04L 29/06* (2006.01)
*G06F 21/31* (2013.01)
*G06Q 10/02* (2012.01)
*G06Q 10/06* (2012.01)
*G06Q 10/10* (2012.01)

(52) U.S. Cl.
CPC ............ *H04L 63/107* (2013.01); *G06F 21/31* (2013.01); *G06Q 10/02* (2013.01); *G06Q 10/06* (2013.01); *G06Q 10/10* (2013.01); *H04L 63/0272* (2013.01); *H04L 63/08* (2013.01); *G06F 2221/2111* (2013.01); *G06F 2221/2137* (2013.01); *H04L 2463/082* (2013.01)

(58) Field of Classification Search
CPC ............. G06F 21/31; G06F 2221/2111; H04L 2463/082
See application file for complete search history.

(56) References Cited

U.S. PATENT DOCUMENTS 7,805,128 B2  9/2010 Bentley et al.
8,572,696 B1 * 10/2013 Wiacek ............... H04W 4/02
                                                   380/247

(Continued)

OTHER PUBLICATIONS

David Longenecker, "Should you turn off multifactor authentication before traveling overseas?", https://www.securityforrealpeople.com/2015/12/should-you-turn-off-multifactor.html, Published on: Dec. 24, 2015, 2 pages.

(Continued)

*Primary Examiner* — James R Turchen
(74) *Attorney, Agent, or Firm* — Newport IP, LLC; Mike R. Cicero

(57) ABSTRACT

Techniques disclosed herein enable a system to reduce user authentication requirements during a user's travels by analyzing transportation data and/or event data sent to the user via a communication service, e.g. email. The system may analyze the data in order to determine where the user will be at some future time and, ultimately, to then validate access requests against such determinations to mitigate the need for heightened user authentication requirements while the user is traveling. For instance, the system may identify an airline reservation sent to the user and enable the user to confirm that she has corresponding travel plans. Once she confirms her travel plans, the system may refrain from increasing authentication requirements from Single-Factor Authentication (SFA) to Multi-Factor Authentication (MFA) input requirements for access requests that match the confirmed travel plans.

19 Claims, 7 Drawing Sheets

(56) References Cited

U.S. PATENT DOCUMENTS

| | | | |
|---|---|---|---|
| 8,869,243 B2 | 10/2014 | McGeehan et al. | |
| 9,088,560 B1 | 7/2015 | Newstadt et al. | |
| 9,098,688 B1* | 8/2015 | Jackson | H04W 4/023 |
| 9,122,853 B2 | 9/2015 | Thompson | |
| 9,177,125 B2* | 11/2015 | Steeves | G06F 21/31 |
| 9,185,117 B2 | 11/2015 | Grigg et al. | |
| 9,449,156 B2* | 9/2016 | Kafka | G06F 21/31 |
| 9,491,580 B1* | 11/2016 | Hagon | H04W 4/90 |
| 9,843,649 B1* | 12/2017 | Hampson | H04L 67/325 |
| 10,055,571 B2* | 8/2018 | Aratsu | H04W 4/02 |
| 2004/0102979 A1* | 5/2004 | Robertson | G06Q 10/025 705/6 |
| 2008/0120718 A1* | 5/2008 | Bentley | G06F 21/35 726/21 |
| 2008/0228721 A1* | 9/2008 | Wahl | G06F 21/316 |
| 2009/0012824 A1* | 1/2009 | Brockway | G06Q 10/02 705/6 |
| 2010/0023455 A1* | 1/2010 | Dispensa | G06Q 10/02 705/44 |
| 2010/0174998 A1 | 7/2010 | Lazarus et al. | |
| 2011/0004921 A1 | 1/2011 | Homer et al. | |
| 2011/0208601 A1* | 8/2011 | Ferguson | G06Q 20/18 705/16 |
| 2013/0006858 A1* | 1/2013 | DePetro | G06Q 20/3224 705/44 |
| 2013/0031598 A1* | 1/2013 | Whelan | G01S 1/725 726/1 |
| 2013/0055370 A1* | 2/2013 | Goldberg | G06F 21/31 726/7 |
| 2013/0167207 A1 | 6/2013 | Davis et al. | |
| 2013/0297551 A1* | 11/2013 | Smith | G06N 5/02 706/48 |
| 2013/0305357 A1* | 11/2013 | Ayyagari | H04W 12/06 726/22 |
| 2014/0289821 A1 | 9/2014 | Wilson | |
| 2015/0073841 A1* | 3/2015 | Gray | G06Q 10/02 705/5 |
| 2015/0089585 A1* | 3/2015 | Novack | H04L 63/08 726/3 |
| 2015/0227728 A1* | 8/2015 | Grigg | G06F 21/31 726/4 |
| 2015/0227924 A1* | 8/2015 | Grigg | G06Q 20/382 705/64 |
| 2015/0227926 A1* | 8/2015 | Grigg | G06Q 20/32 705/64 |
| 2015/0229623 A1 | 8/2015 | Grigg et al. | |
| 2015/0319185 A1* | 11/2015 | Kirti | H04L 63/1416 726/23 |
| 2015/0358769 A1* | 12/2015 | Cudak | H04W 4/02 455/456.4 |
| 2016/0189158 A1* | 6/2016 | Eramian | G06Q 20/40145 705/44 |
| 2017/0115125 A1* | 4/2017 | Outwater | H04W 4/40 |
| 2017/0195307 A1* | 7/2017 | Jones-McFadden | H04L 63/083 |
| 2018/0013843 A1* | 1/2018 | Roberts | H04L 67/22 |
| 2018/0145990 A1* | 5/2018 | DiAcetis | H04L 63/107 |

OTHER PUBLICATIONS

Sharp, et al., "Enhancing Web Browsing Security on Public Terminals Using Mobile Composition", In Proceedings of the 6th international conference on Mobile systems, applications, and services, Jun. 17, 2008, pp. 94-105.

"International Search Report and Written Opinion Issued in PCT Application No. PCT/US2018/012853", dated Mar. 27, 2018, 11 Pages.

* cited by examiner

REDUCED USER AUTHENTICATION INPUT REQUIREMENTS

BACKGROUND

Multi-Factor Authentication (MFA) requirements can be triggered under various circumstances and can require layers of user inputs that present barriers for users to successfully accessing account data. Although requiring heightened login requirements generally carries the noble intention of protecting a user's information from misappropriation by an unauthorized entity, forcing a user into a non-routine authentication protocol may bear the unintended consequence of delaying or even outright restricting access from authorized users. For instance, for access requests that originate away from the user's home, a service provider may require an answer to a security question or a code from a security key fob as an added factor associated with MFA. Unfortunately, the user could inadvertently leave the security key fob at home while traveling or simply forget the answer to the security question as it may have been provided years past when the user initiated the account. In either case and as an example, upon traveling out of country the user's login requests will be denied by the service provider and the user will be unable to access the valuable information held in the account.

It is with respect to these and other considerations that the disclosure made herein is presented.

SUMMARY

Techniques described herein provide reduced user authentication input requirements. Generally described, configurations disclosed herein enable a system to reduce user authentication requirements when a user is traveling by using transportation data and/or event data that is extracted from reservation data sent to the user via a communication service, e.g. email. The system may analyze the reservation data in order to determine where the user will be at some future time and, ultimately, to then validate access requests against such determinations to mitigate the need for heightened user authentication requirements when the user attempts to access sensitive materials (e.g. confidential corporate assets and/or materials protected under a medical privacy rule) while traveling. For example, the system may identify an airline reservation sent to the user and enable the user to confirm that she has corresponding travel plans. Once she confirms her travel plans, the system may refrain from increasing authentication requirements from Single-Factor Authentication (SFA) to Multi-Factor Authentication (MFA) input requirements for access requests that match the confirmed travel plans. As a specific example, if the user confirms that she plans to travel from her home town of San Francisco to Vancouver, BC on Apr. 24, 2017, then the system may allow her to access various user accounts while in Vancouver using the normal SFA input requirements rather than upping the requirements to MFA during her confirmed travel period in response to the out of town origin of the requests.

The transportation data identifies transportation segments that are indicative of a probable future location of the user. Exemplary transportation segments include but are not limited to scheduled airline flights, trains, ferries, busses, or car rental pick-ups/drop-offs. The transportation data may indicate dates and locations corresponding to the transportation segments. As an example, for a scheduled airline flight the corresponding transportation data may indicate a specific departure airport and time and a specific arrival airport and time (e.g. by a unique airport identifier such as KSFO). The event data identifies events that are indicative of a probable future location of the user. Exemplary event data includes but is not limited to tickets to expositions, concerts, professional training events, hotel or other lodging reservations, etc. For instance, event data may include an event ticket in the form of an email or a file attached to an email where the ticket indicates a date, time, and location of a corresponding an entertainment event.

In some configurations, the techniques disclosed herein enable a system to extract reservation data from electronic communications held in or transmitted through a communication service such as, for example, an email service, an instant messaging service, etc. For instance, the system may identify airline confirmation emails sent to the user to extract reservation data indicative of a future time period during which a user is expected to be at a particular geolocation. Based on the reservation data, the system may generate a confirmation wrapper to prompt the user to confirm her travel plans, e.g. confirm that she intends to be at the particular geolocation during the future time period. Although this detailed description provides an example scenario in which the user is traveling for business purposes (i.e. to travel to Surrey, BC to lead a meeting for her employer), it can be appreciated that the system and techniques described herein can be used to confirm any type of travel plan regardless of their reason of origin. For example, the confirmation wrapper may be sent to confirm leisurely travel such as a family trip to a famed movie-themed resort as well as business travel such as a trip to attend a professional conference and/or continuing education seminar to fulfill professional licensure requirements. In some embodiments, the system may be configured to provide extra scrutiny to access requests that originate from locations that are unassociated with the user. For example, the system may require merely SFA for access requests originating near the user's home or work but MFA for access requests originating from anomalous locations, i.e. locations that deviate from or are inconsistent with one or more locations that the user is expected to be at. Based on the user's confirmation of her travel plans, the system may then treat access requests originating from confirmed locations during confirmed time period as non-anomalous and process the request according to SFA. As will be described herein, such confirmed locations and confirmed time period may be used to define temporary trust zones from which a user may login without triggering heighted authentication protocols.

In some embodiments, the communication service may rely upon an authentication service to process, in whole or in part, requests to access electronic communications from a user account. For instance, an email service may rely upon the authentication service to process requests to access email accounts managed by the email service. Furthermore, in some embodiments, the communication service may be a component of a productivity suite (e.g. Google® G-Suite™, Zoho® Office Suite, or Microsoft® Office 365™) such that upon signing into the communication service, which may be an email service offered as part of the productivity suite, the user is simultaneously given access to a plurality of other components of the productivity suite. In some embodiments, the communication service may include an authentication module which obviates reliance on a separate authentication service. For instance, the communication service may be a stand-alone email service having its own user authentication abilities incorporated therein.

For illustrative purposes, consider a scenario where a user lives and works in the San Francisco Bay area but periodically makes business trips during which she needs full access to her work email and various other components of a Productivity Suite account. In an effort to balance its interests in providing employees with reliable and convenient access to their Productivity Suite accounts against its interests in protecting sensitive business data, the user's employer may allow her to access her account with SFA from non-anomalous locations such as, for example, downtown where she works and from within a predetermined radius around her home in Daly City. However, the user's employer may increase authentication requirements to a level of MFA for access requests originating outside these trusted locations or "trust zones." Thus, if the user were to request account access from an out of town location, the employer's authentication policy may require her to provide one or more additional factors evidencing her identity. For instance, her employer may permit her to access her account from home or work by entering a single password but may require her to provide the password and answer a security question to access the account from some anomalous location since such attempts are relatively more likely to be fraudulent, i.e. being originated by someone other than the user. However, during a time period in which the user is traveling, access requests originating near her physical location are more likely to be from her than an access request originating from her home town. Stated another way, a permanent trust zone (e.g. a home location, a work location, etc.) may temporarily become inactive due to her confirmed travel away from the permanent trust zone. It is with respect to this consideration, among others, that the generation of temporary trust zones is described herein.

In some configurations, the system can analyze reservation data sent through the communication service to determine when the user is likely to be away from home and where the user is likely to be. Then, based on this a priori knowledge of the user's location, the system may refrain from increasing the burden of signing into the user's accounts during these preidentified and/or pre-confirmed travel plans. In some configurations, the system may use extracted portions of the reservation data to generate a confirmation wrapper that prompts the user to confirm her travel plans. The confirmation wrapper may be in the form of an email which indicates that a probable travel event has been identified based on some reservation data (e.g. an airline confirmation), provides relevant details of the probable travel event, and enables the user to confirm, deny, and/or edit details of the probable travel event. For example, a confirmation wrapper may indicate that an airline has sent a confirmation email for an outbound flight from San Francisco, Calif. to Vancouver, BC and a return flight from Bellingham, Wash. to back to San Francisco, Calif. The confirmation wrapper may also provide some means for the user to indicate to the system whether she will be traveling on those flights and/or additional data regarding where she will be during her travels.

Based on the user's response to the confirmation wrapper—if any—the system can also generate a confirmed itinerary that associates confirmed details of the user's travel plans with an account of the user. For example, if the user replies to the confirmation wrapper by confirming that she will be traveling to Vancouver, BC on the outbound flight and back home on the return flight from Bellingham, the system may store these details in relation to her account so that login requests originating between Vancouver, BC and Bellingham may be treated as non-anomalous or expected during that week of her travels. In some configurations, the confirmation wrapper may enable the user to provide additional details regarding her travels to enable the system to select between authentication protocols with refined accuracy. For example, the confirmation wrapper may enable the user to further indicate that she will spend five days near her engineering firm's offices in Surrey, BC before spending the weekend with relatives in Blaine, Wash. just south of the international border before ultimately driving to the Bellingham International Airport the morning of her return flight. The system may use these additional details to refine the accuracy of confirmed time periods and corresponding locations and/or temporary trust zones. For example, based on these additional details, the system may deem access requests originating from the town of Langley, BC as anomalous during the entire trip as the user did not confirm she would be traveling to Langley and also treat access requests from Surrey, BC on the final weekend of her trip as anomalous as she indicated she would have left Surrey by then.

Configurations disclosed herein provide a marked improvement to the technological field of user authentication for at least the reason that conventional authentication systems lack the ability to account for predetermined travel plans in selecting an appropriate level of authentication requirements to impose in response to access requests. In particular, conventional authentication systems generally impose pre-determined and static authentication requirements on their users regardless of their current location. However, if a user spends most of her time in her home town, then most of the time requests for access to her account that originate from outside her home town are likely to be inauthentic, i.e. not originated by her. Thus, there are benefits to imposing heightened authentication requirements on access request originating from anomalous locations as such requests may be malicious attempts to infiltrate the user's account. Typically, increasing authentication requirements includes increasing the number of evidentiary factors the user must provide in order to access her account (e.g. from a one factor to multiple factors or from N factors to M factors where N and M are integers and M is greater than N). However, there are a variety of reasons why a user may be unable to provide such additional factors while traveling. For example, if the additional factor is to enter a text message provided code within a relatively short time period, the user may be unable to do so due to telecommunications carrier incompatibilities and/or having turned off "roaming" data to avoid severe telecommunications charges. Accordingly, configurations disclosed herein improve upon conventional authentication systems by analyzing communications associated with the user to obtain a priori knowledge of where she will be and when to mitigate the necessity of imposing burdensome authentication requirements on her while traveling according to preidentified and/or pre-confirmed itineraries.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings. This Summary is provided to introduce a selection of concepts in a simplified form that are further described below in the Detailed Description.

This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicates similar or identical items. References made to individual items of a plurality of items can use a reference number with a letter of a sequence of letters to refer to each individual item. Generic references to the items may use the specific reference number without the sequence of letters.

FIG. 1A illustrates an example data flow scenario of a system that provides reduced user authentication input requirements during preidentified travel plans by using reservation data and/or confirmed itinerary data to deem predetermined travel locations as temporary trust zones.

FIG. 1B illustrates another example data flow scenario of a system that provides reduced user authentication input requirements during preidentified travel plans by using reservation data and/or confirmed itinerary data to deem predetermined travel locations as temporary trust zones FIG. 2 illustrates aspects of a user interface that can be displayed on a user device to communicate details of a confirmation wrapper as described herein. This example user interface can be displayed on a variety of device types, such as a desktop computer, mobile device or a combination of devices.

DETAILED DESCRIPTION

The following Detailed Description describes technologies enabling reduced user authentication input requirements during preidentified travel plans for individual users. Generally described, configurations disclosed herein reduce an amount of user inputs required to authenticate a user during preidentified travel plans by parsing communications sent to a user account to extract, for example, transportation data that corresponds to the user. For example, techniques disclosed herein can enable a computing system to identify transportation data and use it to generate a confirmation wrapper that enables a user to confirm specific travel details extracted from the transportation data. Based on a response to the confirmation wrapper, the system can then generate a confirmed itinerary corresponding to the travel details. Then, while the user is traveling, the system can validate account access requests against the confirmed itinerary to select between multiple authentication protocols.

For illustrative purposes, consider a scenario where a user lives and works in the San Francisco Bay area but periodically travels out of town on business while still needing full access to her work email and/or various other components of a Productivity Suite account. The system may determine that the user frequently logs into her user account from her home and work such that login attempts originating from these locations have a high probability of being authentic, e.g. being originated by her as opposed to an unauthorized third-party. In some situations, the user may even have instructed the system to trust these locations. Accordingly, these locations may be designated with the system as trust zones such that a relatively less burdensome authentication protocol may be required for requests originating from these locations as compared to requests originating outside these trust zones. For example, a user may be allowed to access her account from home or work with a single piece of evidence (e.g. entering a password or having simply possession of a particular computing device) but may be required to provide multiple pieces of evidence to access her account from out of town unless the system knows about the user's travel plans ahead of time. In particular, in the absence of preidentified and/or pre-confirmed travel plans, the system may have little or no information about where a user will be and when. The system may merely know that the user is frequently at home or work and, therefore, may trust requests from these locations enough to require a relatively lesser authentication protocol as compared to other requests. However, by actively extracting data from the user's communications account to determine where the user will be and when, the system may gain trust for access requests originating from locations and times that correspond to the system's a priori knowledge of the user's travel plans.

Figure 1A:
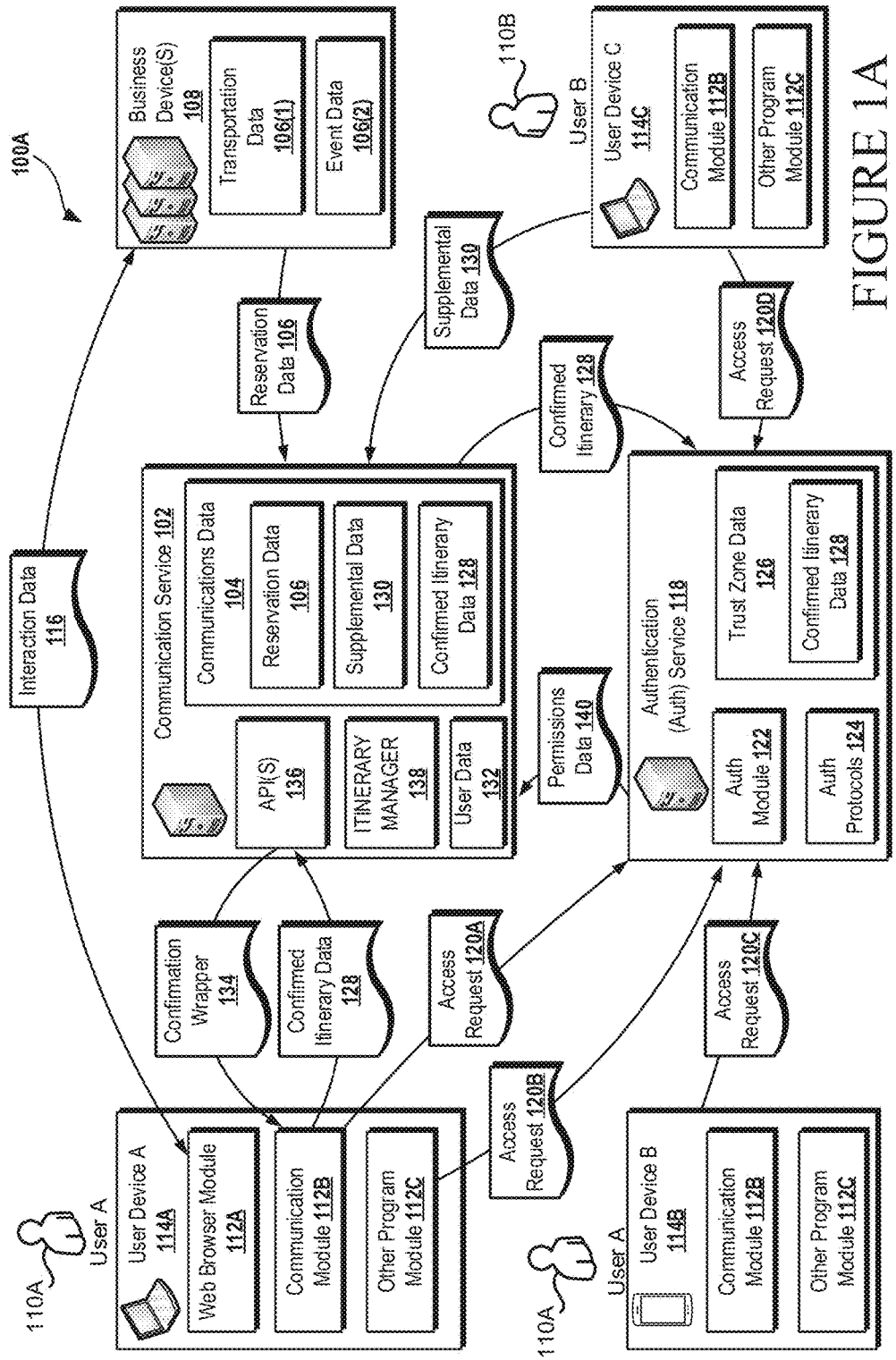
Figure 1B:
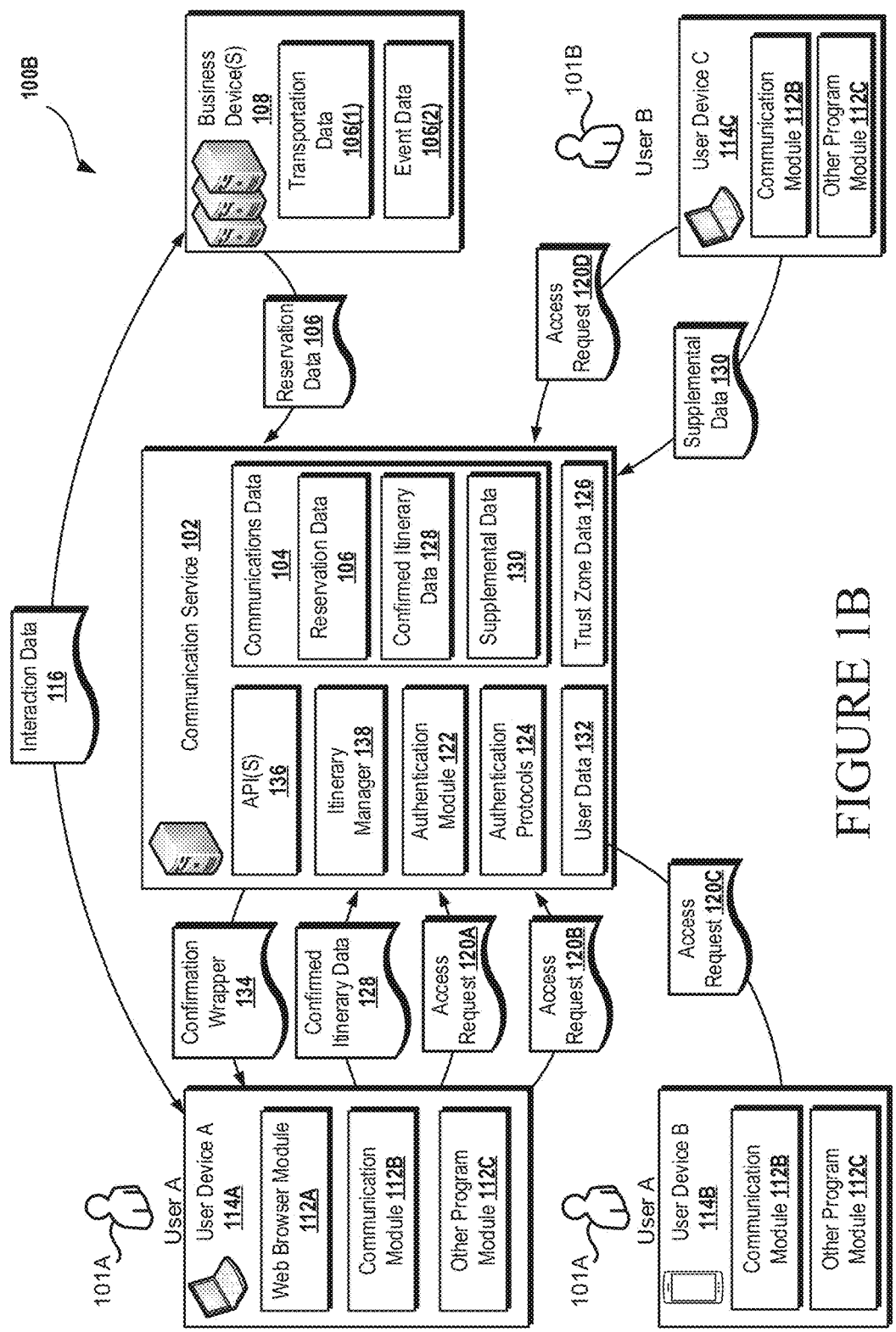

To illustrate aspects of the techniques disclosed herein, FIGS. 1A-1B illustrate exemplary data flow scenarios of a system that provides reduced user authentication input requirements during preidentified travel plans. The scenarios of FIGS. 1A-1B include a communication service 102 which stores communications data 104 corresponding to user accounts such as, for example, an email or instant messaging account of user A 110A. The communication service 102 may receive, from business device(s) 108, at least some reservation data 106 that is sent to a user account associated with user A 110A. For instance, in response to user A 110A operating a web browser module 112A on user device A 114A to interact with the business device(s) 108, the business device(s) 108 may generate at least some of the reservation data 106 and transmit it to the user account. As an example, the business device(s) 108 may deploy an online booking service that enables user A 110A to book a flight and/or purchase concert tickets which then triggers the reservation data 106 to be sent to the user account. In some instances, user A 110A may interact with the business device(s) 108 without using the communication service 102, e.g. interaction data 116 may pass between devices 114A and 108 without passing through the communication service 102. For example, in some scenarios the business device(s) 108 may include servers and/or virtual machines configured to deploy an online flight booking service to enable users to search through flight options and purchase flight tickets directly via the web browser module 112A (e.g. Safari® by Apple®, Firefox® by Mozilla®, or any other module providing user access to the Internet). Thus, although the reservation data 106 may ultimately be accessible by the communication service 102, in some scenarios this may occur only after a reservation has been made through means other than the communication service 102 such as online and/or telephonic ticket purchases.

Although these example scenarios describe selecting between multiple authentication protocols 124 for requests to access a user account on the communication service 102, it can be appreciated that the techniques disclosed herein can be applied to any scenario in which lessening user authentication requirements is desirable for account access requests that correspond to a priori knowledge of user travel plans. For instance, the techniques disclosed herein can be applied to requests to access financial-accounts (e.g. an account holder swiping a credit or debit card at a point-of-transaction) or requests to access a virtual-private-network (VPN) account while traveling (e.g. an employee attempts to "VPN into" work resources while traveling).

The example in FIG. 1A illustrates a scenario where a system 100A includes an authentication service 118 that authenticates access requests 120A, 120B, 120C (which may be collectively referred to herein as 120) associated with logging into or otherwise accessing the communication service 102 (or other services for that matter such as by swiping a credit card). For instance, user A 110A may interact with user device A 114A to cause a communication module 112B (e.g. a local or web-based email application such as Gmail™ webmail service or Microsoft® Outlook®) to send an access request 120A to the authentication service 118. The authentication service 118 may include an authentication module 122 that processes the access request 120A by selecting between a plurality of authentication protocols 124 based on characteristics of the access request 120A. For instance, to determine whether the access request 120A is anomalous or expected, the authentication module 122 may determine a geolocation and/or IP address of origin for the access request 120A and then compare it to trust zone data 126 associated with user A 110A to select an appropriate one of the authentication protocols 124. The trust zone data 126 may indicate prior known locations of the user, a frequency with which such locations are visited by the user, a recency with which such locations have been visited, and confirmed temporary locations corresponding to confirmed user travel plans. The access request 120A originating from a "trust zone" such as user A's 110A home or a temporary trust zone as described herein may trigger the authentication module 122 to select a first authentication protocol over one or more other authentication protocols that could be selected under other circumstances. In some embodiments, the authentication module 122 is configured to select an N-factor authentication protocol for access requests 120 that originate from trust zones and an M-factor authentication protocol otherwise—M and N being integers and M being greater than N. For example, the system 100A may be designed based on the premise that a request originating from a location that user A 110A is likely to be physically present at are relatively more likely to be authentic than a request originating from locations that that user A 110A is not likely to be at. Thus, all other things being equal, the characteristic of the access request 120A originating from user A's 110A home or work may cause the system 100A to trust the access request 120A relatively more than it would if the access request 120A had originated from a city that user A 110A has never been to—and has not indicated she will be going to.

As the characteristic of a request 120 originating proximate to user A's 110A current physical location may increase the request's 120 probability of authenticity, the system may enhance the trust zone data 126 with confirmed itinerary data 128 that is indicative of where user A 110A is likely to be at some future time to generate temporary trust zones, e.g. trust zones that remain valid for a period of time corresponding to when the user is traveling. For instance, once the communication service 102 receives the reservation data 106, the system 100A may analyze the reservation data 106 to identify where user A 110A is going to be traveling to. Although the reservation data 106 may come in many forms, an exemplary form is that of an airline reservation confirmation email that is sent by an airline or a third-party booking service to confirm an airline reservation made by or on behalf of user A 110A. In some embodiments, the system 100A may parse such a confirmation email to identify specific details of user A's 110A travel plans. For example, the system 100A may be configured to extract data from fields of the confirmation email based on a predetermined format that is used by a particular entity for automatically generating confirmation emails. In a scenario where the reservation data 106 includes transportation data 106(1) comprising flight confirmations, the system 100A may extract data such as, for example, a departure airport identifier and corresponding departure time as well as an arrival airport identifier and corresponding arrival time.

Although reservation data 106 may include any data indicative of where a user will be at some future time, exemplary forms of reservation data 106 include transportation data 106(1) that identifies transportation segments that are indicative of a probable future location of the user and event data 106(2) that identifies events that are indicative of a probable future location of the user. For instance, transportation data 106(1) may include any type of data associated with transportation segments that user A 110A will be using such as, for example, airline flights, trains, ferries, busses, and/or car rental data. In some instances, transportation data may indicate times and locations corresponding to the transportation segments. Furthermore, event data 106(2) may include any type of indication that a user will be at a particular event. An exemplary form of event data 106(2) may include a confirmation email sent to user 110A from an event ticket vendor in response to user 110A having completed an order for tickets to an event such as, for example, tickets to an investment or technology conference the user will visit for professional purposes and/or a professional sporting event that the user will be entertaining professional clients at. In various embodiments, the system 100A may be configured to search for reservation data 106 within bodies of communications sent to user A 110A and/or within electronic files or documents attached to such communications.

In some embodiments, the system 100A may analyze supplemental data 130 that although not detailing specific travel segments or events nevertheless indicates that user A 110A will be at some particular place at a future time. For example, the system 100A may analyze an email sent to user A 110A from user B 110B and identify an indication that user A 110A will be traveling. For illustrative purposes, consider a scenario where user B 110B sends an email to user A 110A which recites: "Hey Kat, if you could go ahead and head up next week's meeting in Surrey—that would be great. I've booked your flight—see attached. Thanks, B. Lumbergh." In such a scenario, the system 100A may analyze the communication and identify that it indicates user A 110A will be travelling despite lacking precise details regarding when and where. Accordingly, the system 100A may further analyze the communications data 104 for additional details regarding the probable travel event such as by analyzing any files attached to the email to extract additional details about the travel. For example, in a scenario in which user B 110B has attached a file (e.g. an airline confirmation email or pdf airline ticket or a hotel reservation confirmation) to the email, the system 100A may access the attachment to extract reservation data 106 from the body of the email and/or from any attachments.

In some embodiments, the system 100A may be configured to extract reservation data 106 associated with user A 110A from a user account of user B 110B that is separate from the account of user A 110A. For illustrative purposes, consider a scenario where user B 110B makes travel reservations on behalf of himself and on behalf of user A 110A. In such a scenario, the reservation data 106 may be sent to the user account of user B 110B but not that of user A 110A. Accordingly, scanning user A's 110A account alone may be unable to uncover any reservation data 106. However, in analyzing the communication data 104 stored in association with user B's 110B account, the system 100A may identify that some of the reservation data 106 detected corresponds to a user other than user B 110B. Then, the system 100A may parse such reservation data 106 to determine a name of the unidentified traveler to compare the name to a database of user data 132 associated with a plurality of user accounts including that of user A 110A. Using the user data 132, the system 100A may determine that at least some of the reservation data 106 identified on user B's 110B account corresponds to user A 110A.

In some embodiments, the system 100 may use extracted portions of the reservation data 106 and/or the supplemental data 130 to generate a confirmation wrapper 134 to prompt the user to confirm her travel plans, e.g. confirm that she intends to be at or near some particular geolocation at some future time period. For instance, referring briefly to FIG. 2, the confirmation wrapper 134 may be in the form of an email sent to the communications module 112B for the purpose of asking user A 110A to confirm (or deny) travel plans. In some instances, the confirmation wrapper 134 may conspicuously display pertinent portions of the reservation data 106 such as, for example, dates, times, locations, airlines, and/or flight durations associated with one or more flight reservations identified. Although the confirmation wrapper 134 may include various types of data and may be presented in various forms, an exemplary confirmation wrapper 134 may enable user A 110A to confirm travel details and opt into reducing an amount of user input required to sign-into her account while traveling and/or to opt out of allowing the reduction in user inputs.

Figure 2:
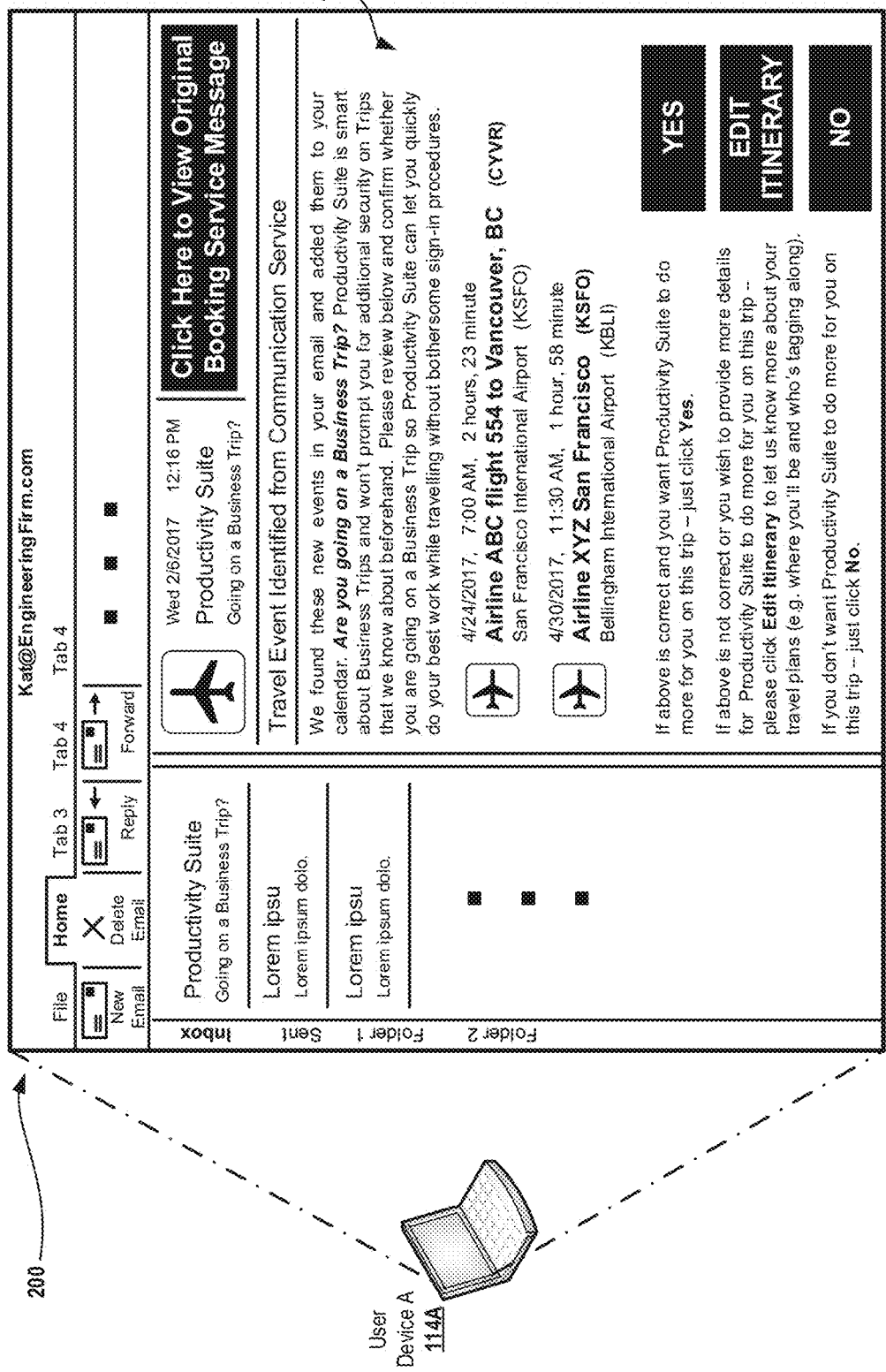

As illustrated in FIG. 2, by clicking the "YES" button user A 110A can confirm that she will be traveling from San Francisco International Airport (KSFO) to Vancouver International Airport (CYVR) on Apr. 24, 2017 departing at 7:00 am and then returning to SFO from Bellingham International Airport (KBLI) on Apr. 30, 2017 departing at 11:30 am. In the illustrated scenario, by clicking "YES" user A 110A will also opt into allowing the system to authenticate access requests 120 which match her travel plans in terms of place and time of origin with a less burdensome user authentication protocol than would otherwise be triggered for access requests originating from the Vancouver area. In other words, by clicking "YES" user A may permit the system to temporarily trust locations or zones corresponding to her travel plans, referred to herein as "temporary trust zones." In contrast, by clicking the "NO" button user A 110A can opt out of temporarily treating requests 120 that originate from locations she intends to travel to as relatively more trusted than they otherwise would be treated, i.e. as trust zones. As further illustrated in FIG. 2, in some scenarios the confirmation wrapper 134 may enable user A 110 A to edit her itinerary before confirming it. For example, by clicking the "EDIT ITINERARY" button user A 110A can edit details of her travel and then, once edits have been manually entered, she can confirm her edited itinerary for the system to validate access requests 120 against. This feature will be discussed in more detail with reference to FIG. 3.

Referring back now to FIG. 1A, in some configurations, the system comprises at least one application programming interface 136 ("API 136") that exposes an interface through which the communication service 102 can send data to and receive data from the user devices 114A-114C and/or the business device(s) 108 and/or the authentication service 118. Through use of this data interface and other interfaces, the devices and services described herein can communicate and process data in such a manner as to enable the functionality disclosed herein. For example, the API 136 may enable the communication service 102 to transmit the confirmation wrapper 134 to the communication module 112B at user device A 114A and to then receive confirmed itinerary data 128 back from the communications module 112B. In some embodiments, the APIs 136 may also provide access to an itinerary manager 138 to enable user A 110A to correct travel details provided within the confirmation wrapper 134 and/or provide additional details which the system is not yet aware of. For example, suppose that user A 110A is still intending on traveling to Vancouver, BC but has called into Airline ABC to move her outbound flight up by a week to Apr. 17, 2017. In the event that updated reservation data 106 was not sent to reflect this change, user A 110A may access the itinerary manager 138 to manually provide this information to the system.

Once obtained, the confirmed itinerary data 128 may then be transmitted to the authentication service 118 to enable validation of access requests 120 against a priori knowledge of the user's probable physical location. For example, suppose that upon user A 110A attempting to access her communications data 104 (e.g. an email account) the communication module 112 B sends the access request 120A to the authentication service 118. Depending on a variety of factors, the authentication service 118 may then select one or more of the authentication protocols 124 to use to process the access request 120A. For example, suppose that user A 110A responded to the confirmation wrapper 134 by confirming the travel details provided in the confirmation wrapper 134 and opting into the reduced authentication requirements. Then, if the access request 120A originates during the confirmed travel period and from within a temporary trust zone between Vancouver, B C and Bellingham, then the system may select a first authentication protocol that is relatively less stringent than a second authentication protocol. In contrast, if the access request 120A originates from Vancouver, BC outside of the confirmed travel period or from outside any temporary trust zone, then the system may select the second authentication protocol. The authentication module 122 may then process the access request 120A according to the selected protocol to generate permissions data 140 that indicates whether the access request 120A has been successfully authenticated. In some embodiments, the authentication service 118 may transmit the permissions data 140 to the communication service 102 for use in determining whether to grant access to user device A 114A based on the access request 120A. For instance, the permissions data 140 may enable the communication service 102 to grant or deny access based on whether the access request 120A passed or failed the corresponding authentication protocol.

In some embodiments, the confirmed itinerary data 128 may be used by the authentication module 122 to select one or more of the authentication protocols 124 to use to process an access request 120B which corresponds to an "other" program module 112C that is different than the communication module 112B. For example, the other program module 112C may be a productivity module that is different than the communication module but is a component of a same Productivity Suite as the communication module 112A. Accordingly, in some embodiments, by confirming her travel plans through a first program module, e.g. the communication module 112B, user A 110A may be relieved of the burden of entering additional security data for an entire Productivity Suite of program modules associated with a common user account as the first program module. Exemplary program modules for which user A 110A may be provided simultaneous access include, but are not limited to, word processing modules, spreadsheet modules, calendar modules, online collaboration modules, document sharing modules, cloud-based document storage modules or any other type of module compatible with a productivity suite (e.g. Google® G-Suite™, Zoho® Office Suite, or Microsoft® Office 365™).

In some embodiments, the authentication module 122 may select between the authentication protocols 124 on a per-device basis such that, all other things being equal, an access request 120C sent by user device B 114B may be processed differently and subjected to a different authentication protocol than access request 120B sent by user device A 114A. For instance, even if the access request 120B corresponds to confirmed travel plans (e.g. it originates from a place and time that the user indicated she would be), the authentication module 122 may differentiate a level of trust between the devices 114A and 114B and select different authentication protocols accordingly. As a specific example, user A's 114A employer may have issued user device 114A to user A 110A and may therefore choose to trust this device more than personal devices that are unassociated with its business. In some embodiments, the authentication module 122 may select between the authentication protocols 124 on a per-device basis such that, all other things being equal, those devices with which user A 110A has been previously associated with may be processed differently and subjected to a different authentication protocol than other devices that have been previously unassociated with user 110A. For instance, providing confirmed itinerary data 128 in response to the confirmation wrapper 134 may reduce the amount of user input required to authenticate access requests from any device which the system knows beforehand as being associated with user 110A.

In some embodiments, the confirmed itinerary data 128 that is provided by user A 110A via user device 114A may be used by the authentication module 122 to select between the authentication protocols 124 for processing an access request 120D which originates from user device C 114C corresponds to user B 110B. For example, as depicted in FIG. 2, in some instances the confirmation wrapper may enable user A 110A to edit itinerary data by providing, among other details, an indication of who she will be travelling with during her business trip. In an instance where user A 110A provides additional details regarding her trip including that user B 110B will be traveling with her, then the confirmed itinerary data 128 provided by user A 110 may be further associated with a user account of user B 110B without participation and/or knowledge of this on the part of user B 110B. It can be appreciated that such a feature will enable co-workers and/or managers to reduce the authentication burden on entire groups of individuals that are traveling according to any particular itinerary. For instance, upon user A 110A taking the time to manually edit and confirm itinerary data, it would be a redundant exercise for user B 110B to enter precisely the same trip details. In some embodiments, confirmed itinerary data 128 may be generated by a user that will not themselves partake in a corresponding travel event. For instance, under various circumstances a manager, co-worker, or secretary of user A 110A and user B 110B may confirm an itinerary on their behalf.

Turning now to FIG. 1B, the example illustrates a scenario where a system 100B includes a communication service 102 comprising an authentication module 122 built in for processing the access request 120A by selecting between the authentication protocols 124 based on characteristics of the access request 120A. For instance, as discussed with relation to FIGS. 1A-1B, the authentication module 122 may determine a geolocation and/or IP address of origin for the access request 120A and then compare it to trust zone data 126 associated with user A 110A to select an appropriate one of the authentication protocols 124. The access request 120A originating from a "trust zone" such as user A's 110A home or work may trigger the authentication module 122 to select a first authentication protocol over one or more other authentication protocols that could be selected under other circumstances. It can be appreciated that system 100B has much in common with system 100A and, therefore, for brevity such similarities need not be discussed in detail with respect to FIG. 1B. It can also be appreciated that there are several differences between these systems; namely, the presence of the authentication service 118 described in relation to FIG. 1A and interactions therewith by other devices are lacking due to system 100B's incorporation of the authentication module 122 into the communication service 102. For example, in contrast with the scenario of FIG. 1A, the access requests are processed at the communication service 102 and, therefore, there is no need to pass permissions data between distinct services.

FIG. 2 illustrates aspects of a user interface 200 that can be displayed on user device 114A to communicate details of the confirmation wrapper 134 as described herein. In the illustrated scenario, the confirmation wrapper 134 has been sent to user A's 110A email inbox to communicate some or all of the reservation data 106 to user A 110A and to prompt her to provide corresponding input. For example, as illustrated the confirmation wrapper 134 displays pertinent details regarding an apparent outbound flight on Airline ABC and an apparent return flight on Airline XYZ which have been extracted from a confirmation email sent to user A from a Booking Service (e.g. KAYAK® Flight Search, Travelocity®, Expedia®, Ticketmaster®, American Airlines®, United Airlines®, or any other booking service). In some embodiments, the confirmation wrapper 134 may also enable direct access to the original message that was sent from the Booking Service. For instance, the confirmation wrapper 134 may provide a button with the text "Click Here to View Original Booking Service Message" which is hyperlinked to the original message. Furthermore, the confirmation wrapper 134 may also indicate the benefit of providing the confirmed itinerary data 128, e.g. that confirming travel details now can save the user from burdensome login requirements during her travels.

The confirmation wrapper 134 may also provide various input options as illustrated below the extracted reservation data, i.e. the flight details. For instance, the confirmation wrapper 134 may provide the user with one or more of the options of: (i) confirming the displayed data and opting into reducing login protocol, e.g. by clicking "YES", (ii) editing itinerary details prior to opting in, e.g. by clicking "EDIT ITINERARY", and (iii) opting out altogether, e.g. by clicking "NO". In some scenarios, upon the user confirming certain itinerary data such as, for example, by clicking "YES" or by clicking "EDIT ITINERARY" and confirming manually entered data instead of or in addition to the displayed data, the system may automatically generate calendar events associated with various confirmed travel details. For example, calendar events may be created for each of the flights and/or any other data such as hotel reservations identified in the event data 106(2), e.g. from a hotel reservation confirmation email.

Figure 3B:
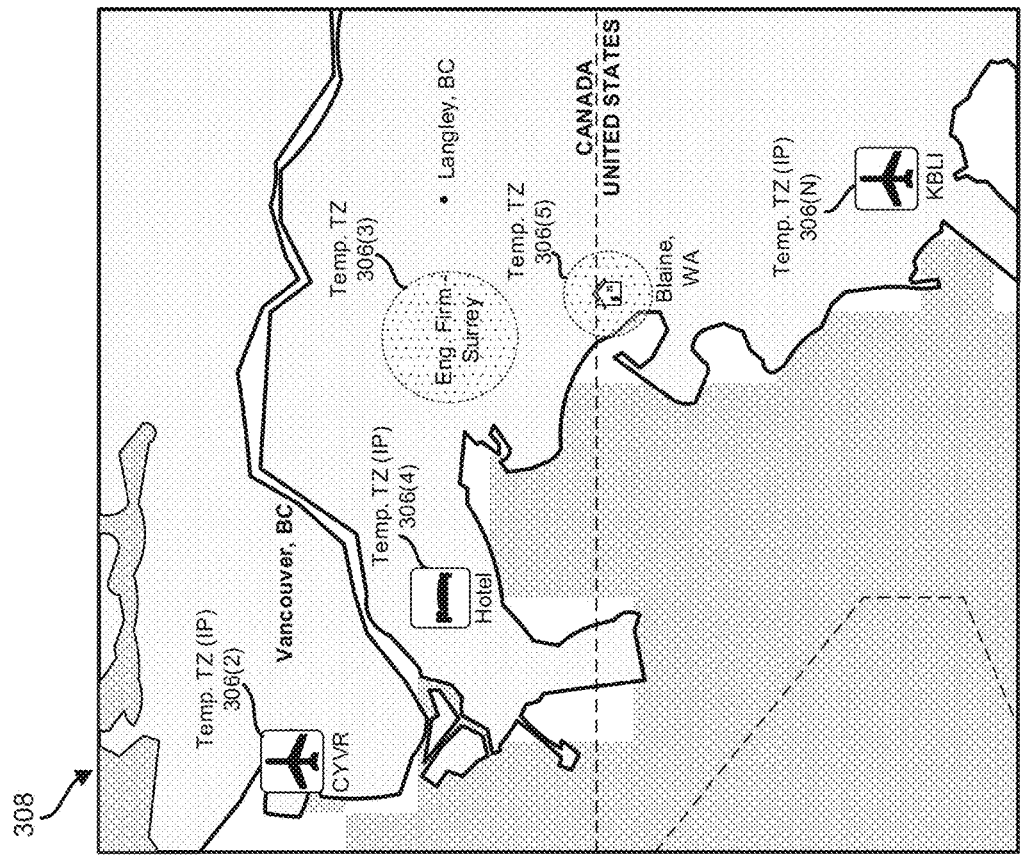
FIG. 3B illustrates various details of a travel destination, associated with travel plans of the user, which includes multiple temporary trust zones for the user.
Figure 3A:
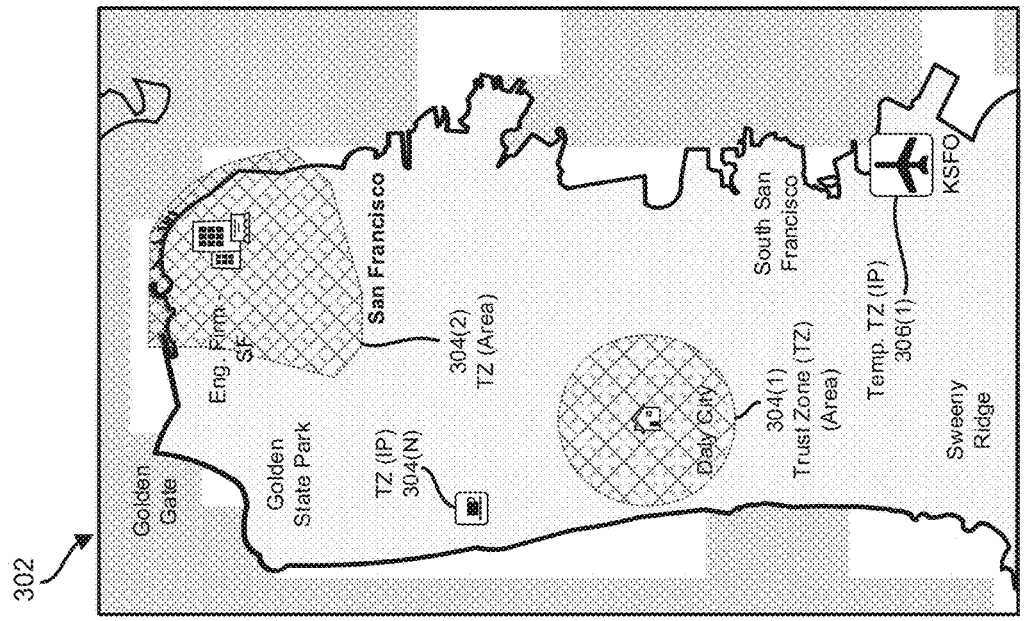
FIG. 3A illustrates various details of a user's home town which includes multiple permanent trust zones for the user and a temporary trust zone.

FIG. 3A illustrates various details of a user's home town 302 which includes multiple permanent trust zones 304(1)-(N) for user A 110A and a temporary trust zone 306(1) that corresponds to the confirmed itinerary data 128. Trust zones may be defined by a variety of characteristics such as, for example, areas surrounding relevant landmarks or specific IP addresses from which user A 110A frequently signs into her accounts. Exemplary landmarks on which to base trust zones include but are not limited to user A's 110A home near Daly City, her employer's headquarters in downtown San Francisco, a favorite coffee shop which she frequently visits and logs into work resources from, and/or travel routes which the user frequently uses (e.g. a bus route between work and home.) In some embodiments, the authentication module 122 may analyze the access requests to determine corresponding places and times of origin in order to select between the authentication protocols 124. Accordingly, in a scenario where the access request 120A originates from within a permanent trust zone 304 and/or a temporary trust zone 306 during a period in which it is active, the authentication module 122 may select a relatively less burdensome authentication protocol for user A 10A to log in with than would otherwise be selected. For example, with reference to FIG. 3A, depending on specific setting or parameters of the authentication module 122 (e.g. as set by the user or an IT Department of the user's employer), a first access request which originates from within the trust zone 304(1) may be granted based on SFA whereas a second access request which originates from the Sweeny Ridge area which is outside of the trust zones may require MFA in order to be granted. Thus, it can be appreciated that the burden of authentication as experienced by the user can be lessened when the user logs in from trust zones. It can further be appreciated that the probability of the user being inadvertently denied access to her account due to onerous and/or rarely used authentication factors may be mitigated based on the technologies described herein.

As used herein, references to any number of factors required for authentication are taken from the point of view of the users. For example, stating that the authentication module 122 requires merely SFA from a user to login from her home simply means that the user need only provide a single factor of authenticating evidence—not that the authentication module 122 only relies on a single factor of evidence. In fact, the determination that an access request 120 originates from within a trust zone can itself be considered a factor of authenticating evidence such that while authentication appears to the user to be based merely on SFA, the authentication module 122 supplements the factor provided by the user with its own determinations to perform MFA.

FIG. 3B illustrates various details of a travel destination 308 of user A 110A, associated with travel plans of user A as described herein. Travel destination 308 includes multiple temporary trust zones 306(2)-306(N) which are based on reservation data 106 and/or the confirmed itinerary data 128. FIG. 3A also illustrates a temporary trust zone 306(1) which is based on reservation data 106 and/or the confirmed itinerary data 128. Referring now to FIGS. 3A-3B together, the authentication module 122 may validate access requests 120 against temporary trust zones 306(1)-306(N) and corresponding effective time periods. For example, the temporary trust zones 306 may be defined in terms of both location and time based on the confirmed itinerary data 128 so that access requests 120 which originate during a time period and from geolocations that user A confirmed she would be may be assigned different authentication protocols than requests which originate from these geolocations outside the time period or outside these geolocations altogether.

In some embodiments, the itinerary manager 138 enables users to manually edit an itinerary by adding, deleting, and/or modifying specific itinerary data such as, for example, adding lodging data that indicates a hotel the user will be staying at and on which dates, point-of-interest data that indicates places the user will spend time during her travels. For illustrative purposes, consider a scenario where user A 110A will first be flying from San Francisco International Airport (KSFO) to Vancouver International Airport (CYVR) and then will make her way down to Bellingham International Airport (KBLI) to complete her return leg back to KSFO. It can be appreciated that there are many ways in which user A could complete this trip and that without additional input the system may be required to assign a relatively large trust zone to an area stretching between CYVR and KBLI for the duration of the trip. However, as the specificity regarding where user A 110A will be and when increases, so may the effectiveness at maintaining high security standards for her account while simultaneously reducing the burden on her of logging into her account. Accordingly, in some embodiments, the itinerary manager may enable user A to enter additional details regarding her travel plans. For example, she may indicate that upon arrival at CYVR airport in Vancouver, BC she will immediately get an already reserved rental car and drive directly to her Engineering Firm's Offices in Surrey, BC. Accordingly, temporary trust zones 306(2) and 306(3) may be established for the CYVR airport and her Engineering Firm's Offices in Surrey, BC, respectively. User A 110A may also indicate that she will be staying a hotel and so another trust zone 306(4) may be established with for the hotel. Finally, she may indicate that on the morning of the second to last day of her travels she will drive to a relative's house in Blaine, Wash. to stay the night before driving to KBLI airport to return home. Based on the manually entered itinerary data, the system may be enabled to generate temporary trust zones 306 with greater accuracy than it could without such data.

In some embodiments, one or more trust zones may be defined by a predetermined radius around a trusted point-of-interest. For example, permanent trust zone 304(1) and temporary trust zones 306(3) and 306(5) are defined by circular areas surrounding corresponding points-of-interest (e.g. user A's home, her relatives house, and her employer's Surrey office). Moreover, in some embodiments, the distance of the radius may be based on a location type. For example, as a person may typically frequent many places around their home but may tend to stay closer to a relative's home in an unfamiliar town, the system may define trust zone 304(1) around user A's home based on a larger radius than used to define trust zone 306(5) around the user's relative's home. In some embodiments, one or more trust zones may be defined by irregular boundaries such as by boundaries defining a metropolitan area. For example, permanent trust zone 304(2) may be defined by the bounds of the financial district in downtown San Francisco which may have irregular boundaries as shown. In some embodiments, one or more trust zones may be defined in terms of one or more specific IP addresses rather than geographical locations or areas. For example, those temporary trust zones associated with certain types of locations such as, for example, airports, hotels, or user favorite places (e.g. the coffee shop associated with trust zone 304(N)) may be limited to only IP address that correspond to those locations rather than a geographical area around those locations.

In some embodiments, the itinerary manager 138 may be configured to prompt a user for supplemental itinerary data during a travel period. For example, in a scenario where user A 110A has not confirmed which hotel she will be staying at before her trip, an access request from outside any already define temporary trust zones may trigger the itinerary manager 138 and/or the authentication module 122 to prompt the user to complete a heightened authentication protocol for an initial login and then provide her the option to generate a corresponding temporary trust zone for the duration of her travels. For example, upon successfully logging in with an MFA protocol, user A 110A may be asked via a user interface, "We hope your travels in Vancouver, BC are going well. To help Productivity Suite keep your data secure without burdening you all week long, please let us know if you intend to spend more time at this location this week. If you are then we won't ask you those security questions again—if not we will to protect your data."

In some embodiments, trust zones which do not correspond to the confirmed itinerary data may be temporarily disabled during a period of travel. For example, in the scenario where user A 110A is traveling to the Vancouver, BC metropolitan area during the week of Apr. 24, 2017 before returning on the 30$^{th}$, permanent trust zones 304(1)-304(N) may be temporarily suspended or deemed as untrusted to trigger heighted authentication for requests associated with these places during the travels. Such a feature may be beneficial since a user confirming that she will be traveling to Vancouver, BC during this period decreases the probability that a request for access to her accounts during the same period is authentic in the sense that she originated it.

Figure 4A:
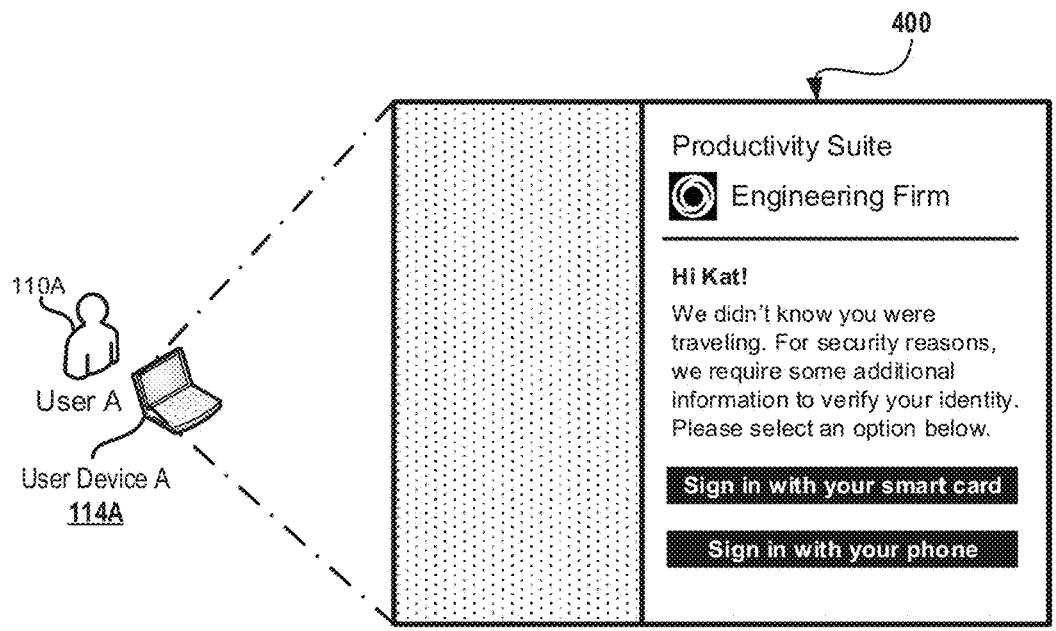
FIG. 4A illustrates aspects of a first user interface that can be displayed on a user device during travels to prompt a user to select a heightened authentication protocol to gain account access.
Figure 4B:
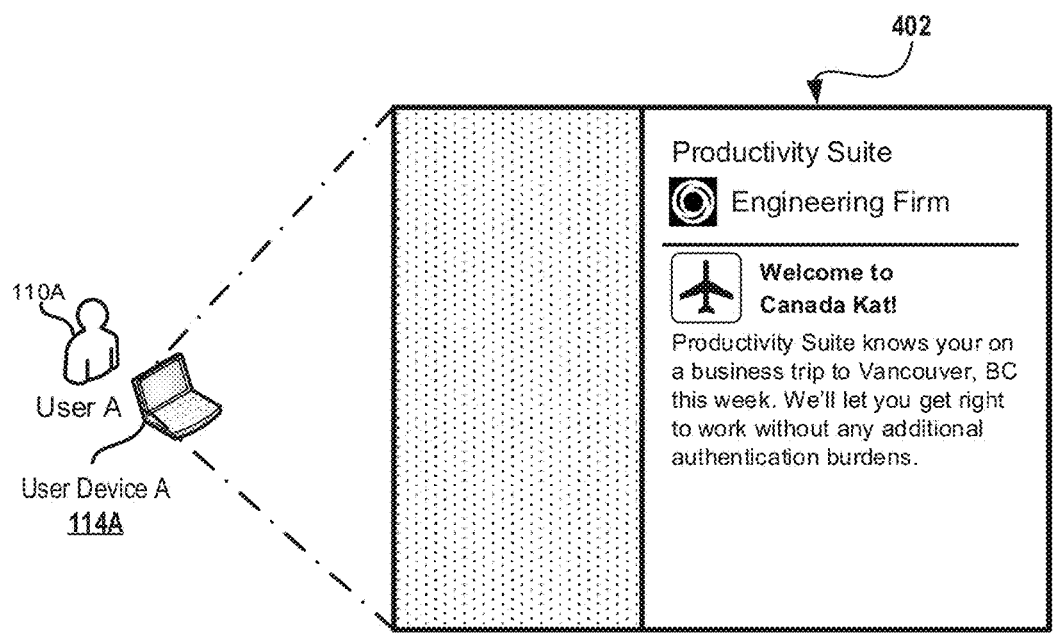
FIG. 4B illustrates aspects of a second user interface that can be displayed on the user device during travels to inform the user that heightened authentication will not be used due to a priori knowledge of her travel plans.

FIG. 4A illustrates aspects of a first user interface 400 that can be displayed on a user device 114A in response to an access request originating from out of town (e.g. outside the region depicted in FIG. 3A) when the system lacks prior knowledge of user travel plans. For example, in a scenario where user A 110A travels to Vancouver, BC as described herein without the system having a priori knowledge of her plans, the authentication module 122 may select an MFA protocol and prompt user A 110A to provide additional evidentiary factors of her identity. As illustrated, such factors may include demonstrating possession of either one of a smart card or a phone. In various embodiments, such additional factors may be used in place of or in addition to a user providing another piece of authenticating evidence, e.g. entering a memorized password. FIG. 4B illustrates aspects of a second user interface 402 that can be displayed on the user device 114A in response to an access request originating from within one of the temporary trust zones 306 during the confirmed travel period (e.g. Apr. 24-30, 2017). For example, in a scenario where user A 110A travels to Vancouver, BC as described herein and attempts to log into her work resources such as the communication service 102 from the trusted location 306(3), the authentication module 122 may simply provide a welcome message and inform user A 110A that due to the system's a priori knowledge of her travels heighted authentication will not be necessary.

Figure 5:
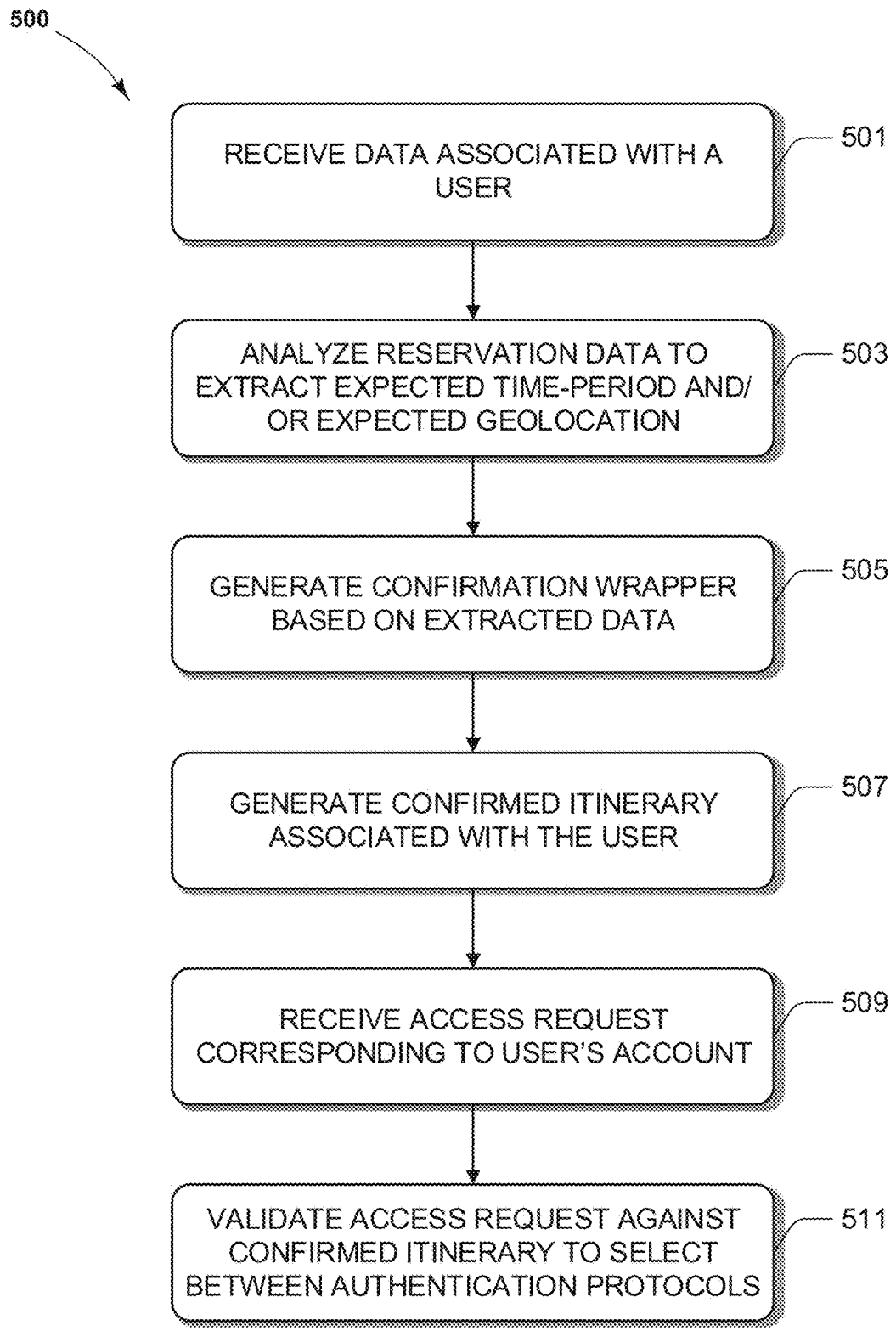
FIG. 5 is a flow diagram of an illustrative process to select between various authentication protocols by validating requests to access a user's account against confirmed itinerary data corresponding to the user.

FIG. 5 is a flow diagram of an illustrative process 500 to select between various authentication protocols by validating requests to access a user's account against confirmed itinerary data corresponding to the user. The process 500 is described with reference to FIGS. 1A-4B. The process 500 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform or implement particular functions. The order in which operations are described is not intended to be construed as a limitation, and any number of the described blocks can be combined in any order and/or in parallel to implement the process. Furthermore, in various embodiments, the operations may be performed by a single system as described in relation to FIG. 1B or the operations may be performed across multiple systems as described in relation to FIG. 1A in which case various communications between systems as shown in FIG. 1A may need to be implemented. Other processes described throughout this disclosure, in addition to process 500, shall be interpreted accordingly.

At block 501, a system may receive data associated with a user 110A such as, for example, the reservation data 106 and/or the supplemental data 130. In some scenarios, the reservation data 106 may be received from a business device 108 such as a server computer, a laptop computer, a desktop computer, or any other type of computing device. For example, in some embodiments, the business device 108 may be a scalable cloud-based server resource that is leased on a subscription basis by a reservation booking service. In some other scenarios, the reservation data 106 may be received from a user device 114C that is associated with a user B 110B. Although illustrated as a laptop computing device in the FIGURES, user device 114C may be a server computer, a laptop computer, a desktop computer, or any other type of computing device. As described herein, exemplary forms of reservation data 106 include, but are not limited to, airline reservation confirmation emails, or concert tickets attached to an email sent to an account of the user A 110A.

At block 503, the system may analyze the reservation data to identify an expected time period at which the user A 110A is expected to be at or near a particular geolocation. For example, the system may identify airline travel legs and associated departure locations and time and arrival locations and times. Based on this identified information, the system may "expect" that the user A 110A will be at or near particular locations at particular times. For example, based on the reservation data 106 illustrated in FIG. 2, the system may "expect" or that user A 110A will be arriving in Vancouver, BC on Apr. 24, 2017 at roughly 9:30 am PST. Although the description references airline reservations numerous times as exemplary reservation data, it should be appreciated that reservation data may include any type of data indicative of a probable user travel even if specific details of the travel are lacking. For example, the system may analyze an incoming email which states, for example, "Dear Kat, "I'm so excited to be back at the lodge with you this fall. I have reserved the entire property for our family from December $3^{rd}$ to the $15^{th}$ and the snow predictions are all awesome—see you on the slopes!" In such a scenario, the system may recognize the message as an indication of future travel and prompt the user for additional information to fill in any blanks.

At block 505, the system may generate a confirmation wrapper based on its analysis of the reservation data 106 to prompt the user for confirmation of any expected time periods and locations identified and/or to provide additional details regarding any finding from the operation at block 503. For example, continuing with the immediately previous example, the system may generate a confirmation wrapper which states: "Productivity Suite has noticed you may be out of town from December 3-15. Is this right? To help us keep your stuff safe without hindering your own access to it, please let us know where you're headed and when as well as anything else you'd like us to know, e.g. how you plan to get there."

At block 507, the system may generate confirmed itinerary data 128 that indicates various details associated with the user's travel plans. For example, the user may reply to the confirmation wrapper by using the itinerary manager 138 to inform the system that she will be traveling to Whistler Blackcomb® ski resort on the upcoming December 3. Based on such reply, the system may generate the confirmed itinerary data to associated with a user account of the user.

Then, at block 509, the system may receive an access request corresponding to the user's account. For example, the user A may 110A travel to Whistler and attempt to login to her work account from her hotel room.

At block 511, the system may validate the access request against the confirmed itinerary data 128 received at block 507 in order to select between a plurality of authentication protocols. For example, depending on pre-set system parameters, the hotel room may or may not fall within a temporary trust zone that has been defined with relation to her trip. In some embodiments, the system parameters may be set by an Information Technology (IT) Department of user A's employer. For example, the IT Department may designate whether the system is to establish temporary trust zones based on the reservation data and, if so, how to define such temporary trust zones. In some embodiments, validating the access request at block 511 may include analyzing a confirmed geolocation (e.g. a location where the user indicated she would be) to determine one or more temporary trust zones to associated with a time period that the user indicated she would be at the geolocation. For example, although the user may merely indicate that she will be at the hotel from December 3-15, the system may infer from the email that stated "see you on the slopes!" that user A will also be frequenting the entire area defined by the ski acreage of Whistler Blackcomb® ski resort.

In some embodiments, validating the request at block 511 may also include selecting an appropriate one of numerous authentication protocols. For example, a first authentication protocol may be selected in response to the request originating from December 3-15 from within the determined trust zone whereas a second authentication protocol may be selected in response to the request originating outside December 3-15 or outside the trust zone.

Figure 6:
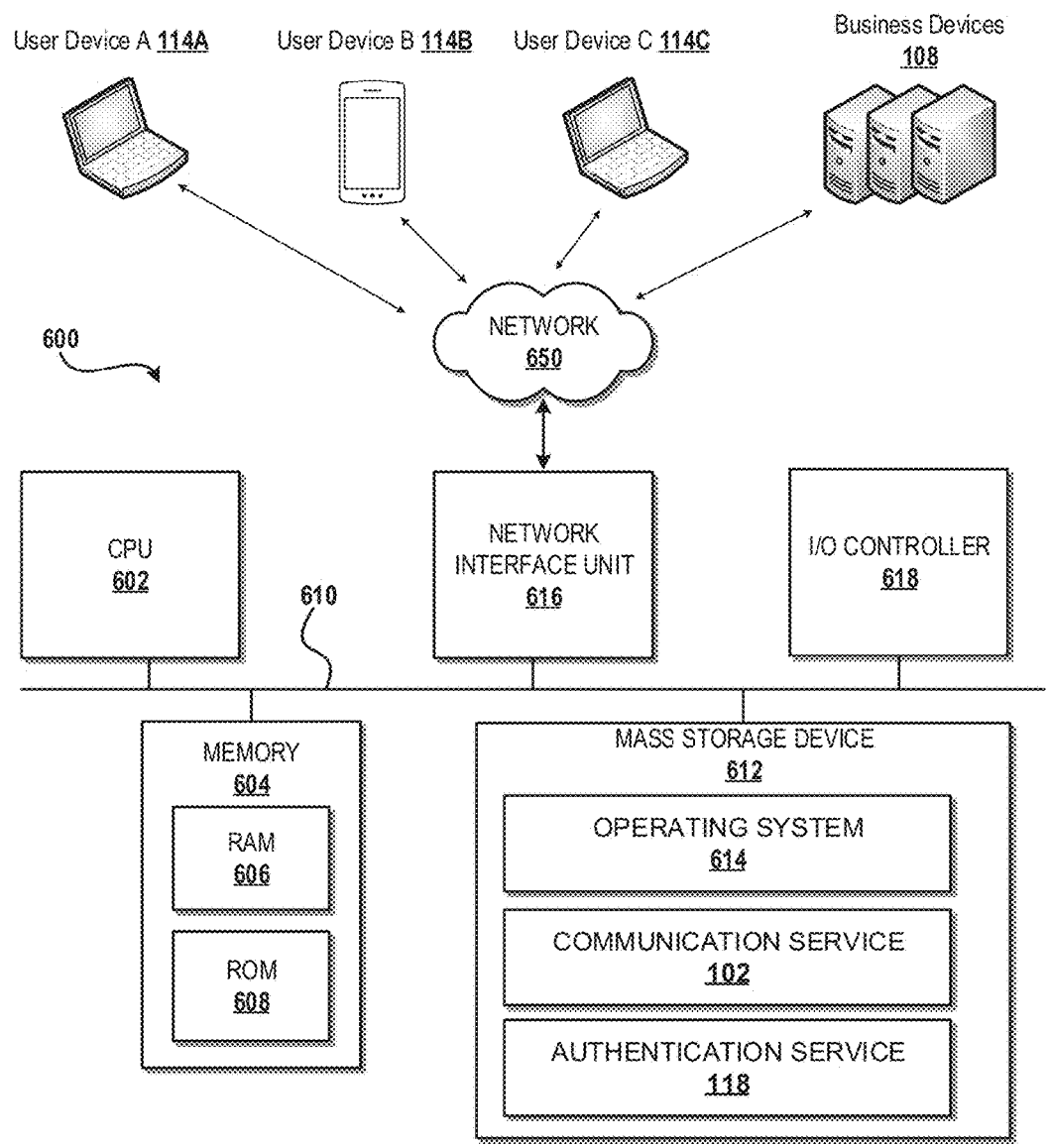
FIG. 6 shows additional details of an example computer architecture for a computer capable of executing the communication service and/or authentication service any program components thereof as described herein.

FIG. 6 shows additional details of an example computer architecture 600 for a computer capable of executing the communication service 102 and/or authentication service 118 any program components thereof as described herein. Thus, the computer architecture 600 illustrated in FIG. 6 illustrates an architecture for a server computer, or network of server computers, or any other types of computing devices suitable for implementing the functionality described herein. The computer architecture 600 may be utilized to execute any aspects of the software components presented herein.

The computer architecture 600 illustrated in FIG. 6 includes a central processing unit 602 ("CPU"), a system memory 604, including a random-access memory 606 ("RAM") and a read-only memory ("ROM") 608, and a system bus 610 that couples the memory 604 to the CPU 602. A basic input/output system containing the basic routines that help to transfer information between elements within the computer architecture 600, such as during startup, is stored in the ROM 608. The computer architecture 600 further includes a mass storage device 612 for storing an operating system 614, other data, and one or more application programs. The mass storage device 612 may further include one or more of the communication service 102 and/or the authentication service 118.

The mass storage device 612 is connected to the CPU 602 through a mass storage controller (not shown) connected to the bus 610. The mass storage device 612 and its associated computer-readable media provide non-volatile storage for the computer architecture 600. Although the description of computer-readable media contained herein refers to a mass storage device, such as a solid-state drive, a hard disk or CD-ROM drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes the claims, the phrase "computer storage medium," "computer-readable storage medium" and variations thereof, does not include waves, signals, and/or other transitory and/or intangible communication media, per se.

According to various configurations, the computer architecture 600 may operate in a networked environment using logical connections to remote computers through a network 650 and/or another network (not shown). The computer architecture 600 may connect to the network 650 through a network interface unit 616 connected to the bus 610. It should be appreciated that the network interface unit 616 also may be utilized to connect to other types of networks and remote computer systems. The computer architecture 600 also may include an input/output controller 618 for receiving and processing input from a number of other devices, including a keyboard, mouse, or electronic stylus (not shown in FIG. 6). Similarly, the input/output controller 618 may provide output to a display screen, a printer, or other type of output device (also not shown in FIG. 6). It should also be appreciated that via a connection to the network 650 through a network interface unit 616, the commuting architecture may enable the communication service 102 and/or the authentication service 118 to communicate with one or more of user devices 114A-C and/or the business device 108.

It should be appreciated that the software components described herein may, when loaded into the CPU 602 and executed, transform the CPU 602 and the overall computer architecture 600 from a general-purpose computing system into a special-purpose computing system customized to facilitate the functionality presented herein. The CPU 602 may be constructed from any number of transistors or other discrete circuit elements, which may individually or collectively assume any number of states. More specifically, the CPU 602 may operate as a finite-state machine, in response to executable instructions contained within the software modules disclosed herein. These computer-executable instructions may transform the CPU 602 by specifying how the CPU 602 transitions between states, thereby transforming the transistors or other discrete hardware elements constituting the CPU 602.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 may include other types of computing devices, including hand-held computers, embedded computer systems, personal digital assistants, and other types of computing devices known to those skilled in the art. It is also contemplated that the computer architecture 600 may not include all of the components shown in FIG. 6, may include other components that are not explicitly shown in FIG. 6, or may utilize an architecture completely different than that shown in FIG. 6.

EXAMPLE CLAUSES

The disclosure presented herein may be considered in view of the following clauses.

Example Clause A, a system for selecting between a plurality of authentication protocols for processing account access requests, the system comprising: at least one processor; and at least one memory in communication with the at least one processor, the at least one memory having computer-readable instructions stored thereupon that, when executed by the at least one processor, cause the at least one processor to implement a communication service and an authentication service, the communication service to: receive, from at least one first computing device, data that indicates an expected time period corresponding to an expected geolocation of a user; generate a confirmation wrapper to request confirmation that the expected time period corresponds to the expected geolocation of the user; receive, from at least one second computing device and based on the confirmation wrapper, a confirmed time period that corresponds to a confirmed geolocation of the user; generate a confirmed itinerary that associates the confirmed time period and the confirmed geolocation with an account of the user; and provide the confirmed itinerary to the authentication service; and the authentication service to: receive a request to access the account of the user; and in response to the request, select an authentication protocol, of the plurality of authentication protocols, based on a validation of the request against the confirmed itinerary.

Example Clause B, the system of Example Clause A, wherein the instructions further cause the authentication service to: determine, based on the confirmed geolocation, a trust zone to associate with the confirmed time period; and select one of: a first authentication protocol, from the plurality of authentication protocols, in response to the request originating during the confirmed time period from within the trust zone; or second authentication protocol, from the plurality of authentication protocols, in response to the request originating during the confirmed time period from outside the trust zone.

Example Clause C, the system of Example Clause A or Example Clause B, wherein the confirmation wrapper is configured to enable the user to provide input to: accept the expected time period as the confirmed-time period, and accept the expected geolocation as the confirmed geolocation.

Example Clause D, the system of any one of Example Clauses A through C, wherein the confirmation wrapper is configured to enable the user to provide input to at least one of modify the expected time period to indicate the confirmed-time period or modify the expected geolocation to indicate the confirmed geolocation.

Example Clause E the system of any one of Example Clauses A through D, wherein the data comprises one or more of transportation data indicating one or more expected transportation segments associated with the user or event data indicating one or more expected events associated with the user.

Example Clause F, the system of any one of Example Clauses A through E, wherein the data comprises an electronic itinerary confirmation that indicates, for at least one transportation segment associated with the user, at least a scheduled departure time corresponding to a schedule departure location and a scheduled arrival time corresponding to a schedule arrival location.

Example Clause G, the system of any one of Example Clauses A through F, wherein the data is generated in response to user interaction data that is transmitted between the at least one first computing device and the at least one second computing device, and wherein the user interaction data is not transmitted through the communication service.

While Example Clauses A through G are described above with respect to a system, it is understood in the context of this document that the subject matter of Example Clauses A through G can also be implemented by a device, via a computer-implemented method, and/or via computer-readable storage media.

Example Clause H, a computer-implemented method, comprising: receiving, from a first computing device, data that indicates an expected time period corresponding to an expected geolocation associated with a user; extracting, from the data, the expected time period and the expected geolocation to generate a confirmation wrapper to prompt a confirmation that the expected time period corresponds to the expected geolocation; receiving, from a second computing device, input that indicates that a confirmed time period corresponds to a confirmed geolocation associated with the user; generating, based at least in part on the input, a confirmed itinerary to associate an account of the user with the confirmed time period and the confirmed geolocation; and communicating the confirmed itinerary to an authentication service, wherein the confirmed itinerary is configured to enable the authentication service to validate a request to access the account based on the request originating during the confirmed time period from within a trust zone corresponding to the confirmed geolocation.

Example Clause I, the computer-implemented method of Example Clause H, wherein the authentication service is configured to provide access to a productivity-suite having at least a communication service for transmitting electronic messages.

Example Clause J, the computer-implemented method of any one of Example Clauses H through I, wherein extracting the expected time period and the expected geolocation to generate the confirmation wrapper comprises extracting the expected time period and the expected geolocation from at least one of the electronic messages.

Example Clause K, the computer-implemented method of any one of Example Clauses H through J, wherein the trust zone is based on one or more parameters that are defined by at least one of the authentication service or a client of the authentication service.

Example Clause L, the computer-implemented method of any one of Example Clauses H through K, wherein communicating the confirmed itinerary to the authentication service comprises transmitting the confirmed itinerary to at least one virtual private network (VPN) service configured to provide secured access to the account of the user.

Example Clause M, the computer-implemented method of any one of Example Clauses H through L, further comprising parsing, based on at least one of the data or the input, supplemental data obtained from a communication service associated with the user to identify one or more of user-defined appointments, event confirmation messages, an associate itinerary of an associate of the user, and wherein the trust zone is based at least in part on the parsing the supplemental data.

Example Clause N, the computer-implemented method of any one of Example Clauses H through M, wherein the input further indicates that the confirmed time period that corresponds to the confirmed geolocation is further associated with one or more other users, and wherein the confirmed itinerary further associates one or more other accounts of the one or more other users with at least the confirmed time period and the confirmed geolocation.

Example Clause O, the computer-implemented method of any one of Example Clauses H through N, wherein the confirmed time period is associated with at least one scheduled departure time and at least one scheduled arrival time of a transportation segment, and wherein the confirmed geolocation is associated with at least one at least one schedule departure location and at least one schedule arrival location of the transportation segment.

While Example Clauses H through O are described above with respect to a method, it is understood in the context of this document that the subject matter of Example Clauses H through O can also be implemented by a device, by a system, and/or via computer-readable storage media.

Example Clause P, a computer-readable storage medium having computer-executable instructions stored thereupon which, when executed by one or more processors of a computing device, cause the one or more processors of the computing device to: receive, from a first computing device, data that indicates at least one of an expected time period or an expected geolocation associated with a user; generate, based on the data, a confirmation wrapper to request confirmation of at least one of the expected time period or the expected geolocation associated with the user; receive, from a second computing device, a response corresponding to the confirmation wrapper, the response including a confirmed time period and a confirmed geolocation corresponding to the user; generate, based at least in part on the response, a confirmed itinerary indicating that the user will be within a trust zone associated with the confirmed geolocation during the confirmed time period, the confirmed itinerary associating an account of the user with at least the confirmed time period and the confirmed geolocation; and select a first authentication protocol, from a plurality of authentication protocols, based at least in part on the request originating during the confirmed time period from within the trust zone.

Example Clause Q, the computer-readable storage medium of Example Clause P, wherein the instructions further cause the one or more processors of the computing device to select a second authentication protocol, from the plurality of authentication protocols, based at least in part on the request originating during the confirmed time period from outside the trust zone.

Example Clause R, the computer-readable storage medium of any one of Example Clause P through Q, wherein the first authentication protocol comprises an N-factor authentication protocol and the second authentication protocol comprises an M-factor authentication protocol, and wherein M and N are integers and M is greater than N.

Example Clause S, the computer-readable storage medium of any one of Example Clauses P through R, wherein the instructions further cause the one or more processors of the computing device to generate an access attempt notification based at least in part on a second request originating during the confirmed time period from within a second trust zone associated with one or more other geolocations that are frequented by the user.

Example Clause T, the computer-readable storage medium of any one of Example Clauses P through S, wherein the instructions further cause the one or more processors of the computing device to: parse supplemental data associated with the user to identify one or more entities corresponding to reservations for one or more of lodging, vehicle pick-up locations, vehicle drop-off locations, professional conventions, or entertainment events; and generate the trust zone based on one or more geolocations associated with the one or more entities.

While Example Clauses P and T are described above with respect to a system, it is understood in the context of this document that the subject matter of Example Clauses S and T can also be implemented by a device, via a computer-implemented method, and/or via computer-readable storage media.

CONCLUSION

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A system for selecting between a plurality of authentication protocols for processing account access requests, the system comprising:
at least one processor; and
at least one memory in communication with the at least one processor, the at least one memory having computer-readable instructions stored thereupon that, when executed by the at least one processor, cause the at least one processor to implement a communication service and an authentication service,
the communication service configured to:
identify, from at least one first computing device, a particular electronic communication that includes reservation data that is associated with a user, wherein the reservation data indicates an expected time period corresponding to an expected geolocation of the user;
generate extracted reservation data by parsing the particular electronic communication, wherein the extracted reservation data includes at least the expected time period and the expected geolocation;
based on the extracted reservation data, generate a confirmation wrapper that prompts for confirmation that the user intends to be present at the expected geolocation during the expected time period;
receive, from at least one second computing device and based on the confirmation wrapper, a confirmed time period that corresponds to a confirmed geolocation of the user, wherein the confirmation wrapper is configured to cause the at least one second computing device to render a user interface element that prompts for at least one of:
modification of the expected time period to indicate the confirmed time period, or
modification of the expected geolocation to indicate the confirmed geolocation;
generate a confirmed itinerary that associates the confirmed time period and the confirmed geolocation with an account of the user; and
provide the confirmed itinerary to the authentication service; and
the authentication service configured to:
receive a request to access the account of the user; and
in response to the request, select an authentication protocol, of the plurality of authentication protocols, based on a validation of the request against the confirmed itinerary.

2. The system of claim 1, wherein the instructions further cause the at least one processor to:
determine, based on the confirmed geolocation, a trust zone to associate with the confirmed time period; and
select one of:
a first authentication protocol, from the plurality of authentication protocols, in response to the request originating during the confirmed time period from within the trust zone; or
a second authentication protocol, from the plurality of authentication protocols, in response to the request originating during the confirmed time period from outside the trust zone.

3. The system of claim 1, wherein the confirmation wrapper is configured to enable the user to provide input to:
accept the expected time period as the confirmed time period, and
accept the expected geolocation as the confirmed geolocation.

4. The system of claim 1, wherein the reservation data comprises one or more of transportation data indicating one or more expected transportation segments associated with the user or event data indicating one or more expected events associated with the user.

5. The system of claim 1, wherein the reservation data comprises an electronic itinerary confirmation that indicates, for at least one transportation segment associated with the user, at least a scheduled departure time corresponding to a schedule departure location and a scheduled arrival time corresponding to a schedule arrival location.

6. The system of claim 1, wherein the reservation data is generated in response to user interaction data that is transmitted between the at least one first computing device and the at least one second computing device, and wherein the user interaction data is not transmitted through the communication service.

7. The system of claim 1, wherein generating the confirmation wrapper is another electronic communication that is configured to inform the user that the extracted reservation data has been parsed from the particular electronic communication, and wherein the other electronic communication includes a link to the particular electronic communication.

8. A computer-implemented method, comprising:
identifying, from a first computing device, an electronic communication that includes reservation data that corresponds to a user, wherein the reservation data indicates an expected time period corresponding to an expected geolocation associated with the user;
generating extracted reservation data by parsing the electronic communication wherein the extracted reservation data includes at least the expected time period and the expected geolocation;
based on the extracted reservation data, generating a confirmation wrapper that prompts for a confirmation that the user intends to be present at the expected geolocation during the expected time period, wherein the confirmation wrapper is configured to cause a second computing device to render a user interface element that prompts for at least one of:
modification of the expected time period to indicate the confirmed time period, or
modification of the expected geolocation to indicate the confirmed geolocation;
receiving, from the second computing device, input that indicates that the user intends to be at a confirmed geolocation during a confirmed time period;
generating, based at least in part on the input, a confirmed itinerary to associate an account of the user with the confirmed time period and the confirmed geolocation; and
communicating the confirmed itinerary to an authentication service, wherein the confirmed itinerary is configured to enable the authentication service to validate a request to access the account based on the request originating during the confirmed time period from within a trust zone corresponding to the confirmed geolocation.

9. The computer-implemented method of claim 8, wherein the authentication service is configured to provide access to a productivity-suite having at least a communication service that is configured to transmitting electronic messages.

10. The computer-implemented method of claim 8, wherein the trust zone is based on one or more parameters that are defined by at least one of the authentication service or a client of the authentication service.

11. The computer-implemented method of claim 8, wherein communicating the confirmed itinerary to the authentication service comprises transmitting the confirmed itinerary to at least one virtual private network (VPN) service configured to provide secured access to the account of the user.

12. The computer-implemented method of claim 8, further comprising parsing supplemental data obtained from a communication service associated with the user to identify one or more of user-defined appointments, event confirmation messages, an associate itinerary of an associate of the user, and wherein the trust zone is based at least in part on the parsing the supplemental data.

13. The computer-implemented method of claim 8, wherein the input further indicates that one or more other users intend to be at the confirmed geolocation during the confirmed time period, and wherein the confirmed itinerary further associates one or more other accounts of the one or more other users with at least the confirmed time period and the confirmed geolocation.

14. The computer-implemented method of claim 8, wherein the confirmed time period is associated with at least one scheduled departure time and at least one scheduled arrival time of a transportation segment, and wherein the confirmed geolocation is associated with at least one at least one schedule departure location and at least one schedule arrival location of the transportation segment.

15. A computer-readable storage medium having computer-executable instructions stored thereupon which, when executed by one or more processors of a computing device, cause the one or more processors of the computing device to:
identify, from a first computing device, an electronic communication that includes reservation data that corresponds to a user, wherein the reservation data indicates at least an expected time period and an expected geolocation associated with the user;
generate extracted reservation data by parsing the electronic communication, wherein the extracted reservation data includes at least the expected time period and the expected geolocation;
generate, based on the extracted reservation data, a confirmation wrapper that prompts for confirmation that the user intends to be at the expected geolocation during the expected time period, wherein the confirmation wrapper is configured to cause a second computing device to render a user interface element that prompts for at least one of:
modification of the expected time period to indicate the confirmed time period, or
modification of the expected geolocation to indicate the confirmed geolocation;
receive, from the second computing device, a response corresponding to the confirmation wrapper, the response including a confirmed time period and a confirmed geolocation corresponding to the user;
generate, based at least in part on the response, a confirmed itinerary indicating that the user will be within a trust zone associated with the confirmed geolocation during the confirmed time period, the confirmed itinerary associating an account of the user with at least the confirmed time period and the confirmed geolocation; and
select a first authentication protocol, from a plurality of authentication protocols, based at least in part on the request originating during the confirmed time period from within the trust zone.

16. The computer-readable storage medium of claim 15, wherein the instructions further cause the one or more processors of the computing device to select a second authentication protocol, from the plurality of authentication protocols, based at least in part on the request originating during the confirmed time period from outside the trust zone.

17. The computer-readable storage medium of claim 16, wherein the first authentication protocol comprises an N-factor authentication protocol and the second authentication protocol comprises an M-factor authentication protocol, and wherein M and N are integers and M is greater than N.

18. The computer-readable storage medium of claim 15, wherein the instructions further cause the one or more processors of the computing device to generate an access attempt notification based at least in part on a second request originating during the confirmed time period from within a second trust zone associated with one or more other geolocations that are frequented by the user.

19. The computer-readable storage medium of claim 15, wherein the instructions further cause the one or more processors of the computing device to:
parse supplemental data associated with the user to identify one or more entities corresponding to reservations for one or more of lodging, vehicle pick-up locations, vehicle drop-off locations, professional conventions, or entertainment events; and
generate the trust zone based on one or more geolocations associated with the one or more entities.

* * * * *